(12) United States Patent
Nomura et al.

(10) Patent No.: US 11,455,526 B2
(45) Date of Patent: Sep. 27, 2022

(54) NEURAL NETWORK DEVICE

(71) Applicant: KABUSHIKI KAISHA TOSHIBA, Minato-ku (JP)

(72) Inventors: Kumiko Nomura, Shinagawa (JP); Takao Marukame, Chuo (JP); Yoshifumi Nishi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 869 days.

(21) Appl. No.: 16/299,634

(22) Filed: Mar. 12, 2019

(65) Prior Publication Data
US 2020/0090037 A1 Mar. 19, 2020

(30) Foreign Application Priority Data

Sep. 18, 2018 (JP) .............................. JP2018-173649

(51) Int. Cl.
*G06N 3/08* (2006.01)
(52) U.S. Cl.
CPC ..................................... *G06N 3/08* (2013.01)
(58) Field of Classification Search
CPC ............... G06N 3/08; G06N 3/04; G06N 3/06
See application file for complete search history.

(56) References Cited

U.S. PATENT DOCUMENTS 5,402,359 A 3/1995 Oyanagi
9,263,036 B1 * 2/2016 Graves ..................... G06N 3/08
9,507,745 B1 11/2016 Bratt et al.
9,886,275 B1 2/2018 Carlson et al.
(Continued)

FOREIGN PATENT DOCUMENTS

JP 4-130968 5/1992
JP 5-197707 A 8/1993
(Continued)

OTHER PUBLICATIONS

Geoffrey W. Burr, "Analog resistive neuromorphic hardware", IBM Research—Almaden, BioComp Summer School, Jun. 30, 2017, 135 pages.
(Continued)

*Primary Examiner* — Kamran Afshar
*Assistant Examiner* — Brian J Hales
(74) *Attorney, Agent, or Firm* — Oblon, McClelland, Maier & Neustadt, L.L.P.

(57) ABSTRACT

According to an embodiment, a neural network device includes: a plurality of cores each executing computation and processing of a partial component in a neural network; and a plurality of routers transmitting data output from each core to one of the plurality of cores such that computation and processing are executed according to structure of the neural network. Each of the plurality of cores outputs at least one of a forward data and a backward data propagated through the neural network in a forward direction and a backward direction, respectively. Each of the plurality of routers is included in one of a plurality of partial regions each being a forward region or a backward region. A router included in the forward region and a router included in the backward region transmit the forward data and the backward data to other routers in the same partial regions, respectively.

14 Claims, 12 Drawing Sheets

(56) References Cited

U.S. PATENT DOCUMENTS

| | | |
|---|---|---|
| 2015/0088797 A1 | 3/2015 | Kim et al. |
| 2016/0284400 A1 | 9/2016 | Yakopcic et al. |
| 2016/0336064 A1 | 11/2016 | Seo et al. |
| 2018/0192265 A1 | 7/2018 | Zawada et al. |
| 2019/0042909 A1* | 2/2019 | Sumbul .................... G06N 3/08 |
| 2019/0236444 A1* | 8/2019 | Cassidy ................... G06N 3/08 |

FOREIGN PATENT DOCUMENTS

| | | |
|---|---|---|
| JP | 2017-502418 A | 1/2017 |
| JP | 2018-97716 A | 6/2018 |
| WO | WO 2018/154494 A1 | 8/2018 |

OTHER PUBLICATIONS

Paul A. Merolla, et al. "A million spiking-neuron integrated circuit with a scalable communication network and interface", Science vol. 345, issue 6197, 2014, 7 pages.

* cited by examiner

FORWARD PROCESS

BACKWARD PROCESS

NEURAL NETWORK DEVICE

CROSS-REFERENCE TO RELATED APPLICATIONS

This application is based upon and claims the benefit of priority from Japanese Patent Application No. 2018-173649, filed on Sep. 18, 2018; the entire contents of which are incorporated herein by reference.

FIELD

Embodiments described herein relate generally to a neural network device.

BACKGROUND

In recent years, techniques for realizing brain-type processors by using implemented-by-hardware neural networks have been proposed. In the brain-type processor, a learning machine internally provides an error data to the neural network, and optimizes weighting coefficients and the like set in the neural network.

In the neural network in the related art, learning processing is executed in a state where normal computational processing is stopped, so that weighting coefficients are optimized. For this reason, the neural network in the related art was able to execute the learning processing by an external processor.

However, in the case of realizing a brain-type processor, the neural network needs to execute computational processing and learning processing in parallel. Therefore, in this case, the neural network needs to execute processing of propagating a computation object data received from an external device in a forward direction and processing of propagating a learning error data in a backward direction in parallel.

However, in a case where the processing of propagating the data in the forward direction to the neural network and the processing of propagating the data in the backward direction are executed in parallel, traffic in the neural network is stagnated, so that the cost is increased, and the processing time is increased.

DETAILED DESCRIPTION

According to an embodiment, a neural network device includes a plurality of cores and a plurality of routers. Each of the plurality of cores executes computation and processing of a partial component in a neural network. The plurality of routers transmit data output from each of the plurality of cores to one of the plurality of cores such that computation and processing are executed according to structure of the neural network. Each of the plurality of cores outputs at least one of a forward data propagated through the neural network in a forward direction and a backward data propagated through the neural network in a backward direction. Each of the plurality of routers is included in one of a plurality of partial regions. Each of the plurality of partial regions is a forward region or a backward region. A router included in the forward region transmits the forward data to another router in the same partial region. A router included in the backward region transmits the backward data to another router in the same partial region.

Hereinafter, a neural network device 10 according to the embodiment will be described with reference to the drawings. The neural network device 10 according to the embodiment can execute normal data processing and learning processing in the neural network in parallel while reducing traffic congestion inside the neural network device 10.

Figure 1:
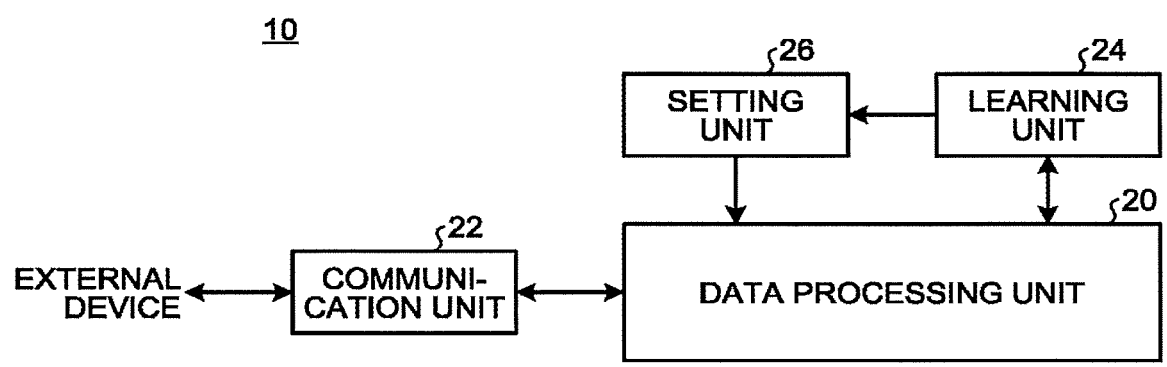
FIG. 1 is a structure diagram of a neural network device according to an embodiment.

FIG. 1 is a diagram illustrating a configuration of a neural network device 10 according to the embodiment. The neural network device 10 includes a data processing unit 20, a communication unit 22, a learning unit 24, and a setting unit 26.

The data processing unit 20, the communication unit 22, the learning unit 24, and the setting unit 26 may be mounted in one semiconductor device, may be mounted in a plurality of semiconductor devices provided on one substrate, or may be mounted in a plurality of semiconductor devices provided on a plurality of substrates. In addition, the learning unit 24 and the setting unit 26 may be realized by the same processor.

The neural network device 10 receives an input data from an external device. The neural network device 10 performs computational processing according to the neural network on the received input data. Then, the neural network device 10 transmits an output data, which is a result of the computational processing according to the neural network, to the external device.

The data processing unit 20 executes normal computational processing based on the neural network. The data processing unit 20 executes various types of information processing such as pattern recognition processing, data analysis processing, and control processing as normal computational processing, for example, based on a neural network.

In addition, the data processing unit 20 executes the learning processing in parallel to the normal computational processing. The data processing unit 20 changes a plurality of coefficients (weights) included in the neural network so as to more appropriately perform the normal computational processing by the learning processing.

The communication unit 22 exchanges data with external devices. Specifically, in the normal computational processing, the communication unit 22 receives an input data to be computed from an external device. In addition, the communication unit 22 transmits an output data as a computation result to the external device.

The learning unit 24 acquires the output data output from the data processing unit 20 in the normal computational processing. Then, in the learning processing, the learning unit 24 calculates an error data representing an error of the output data and provides the error data to the data processing unit 20.

In addition, the learning unit 24 changes a plurality of coefficients (weights) included in the neural network on the basis of the information obtained as a result of the data processing unit 20 propagating the error data in a backward direction to the plurality of layers. For example, the learning unit 24 calculates a gradient of error for each of a plurality of coefficients included in the neural network. Then, the learning unit 24 changes a plurality of coefficients in such a direction that the gradient of the error is, for example, 0.

In a case where the plurality of coefficients included in the neural network are changed by the learning unit 24, the setting unit 26 sets the changed coefficient with respect to the data processing unit 20.

Figure 2:
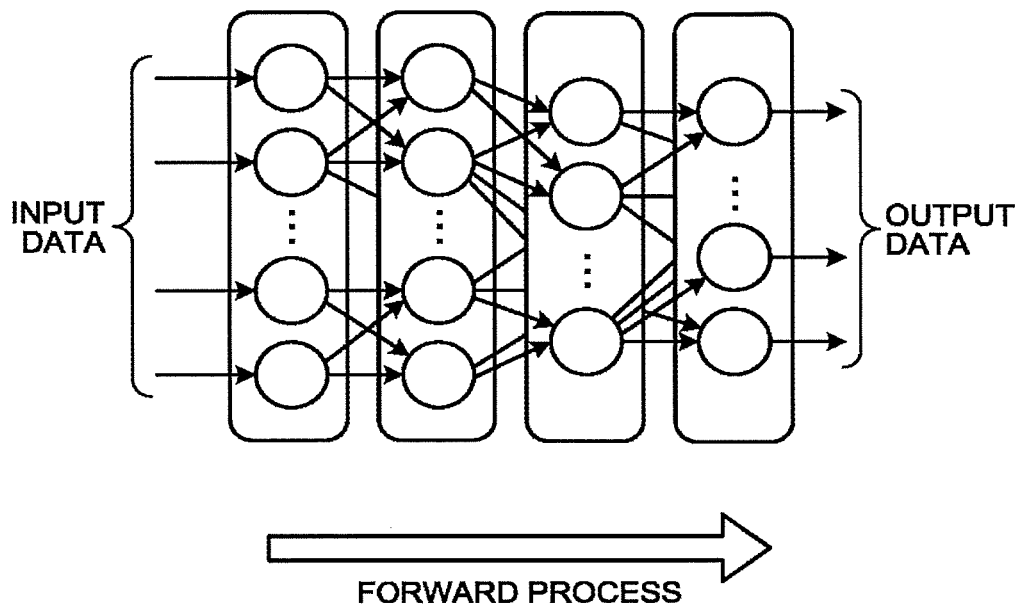
FIG. 2 is a diagram illustrating contents of normal computational processing (forward process)

FIG. 2 is a diagram illustrating contents of the normal computational processing (forward process) in the neural network.

The neural network includes a plurality of layers. Each of the plurality of layers performs predetermined computation and processing on the received data. Each of the plurality of layers included in the neural network includes a plurality of nodes. The number of nodes included in one layer may be different for each layer.

The activation function is set to each node. The activation function may be different for each layer. In addition, in the same layer, the activation function may be different for each node. In addition, the coefficients (weights) are set for the links connecting the respective nodes. In the case of propagating data from the node to the next node, the neural network multiplies the data by the coefficient set for the link. The coefficient is appropriately changed by the learning processing.

The data processing unit 20 executes forward processing of executing the computation while propagating the computation data in the forward direction to a plurality of layers in the neural network in the normal computational processing in the neural network. For example, in the forward processing, the data processing unit 20 provides the input data to the input layer. Subsequently, in the forward processing, the data processing unit 20 propagates the calculated data output from each layer in the forward direction to the immediately following layer. In the forward processing, the data processing unit 20 transmits the computation data output from the output layer to the external device as an output data.

Here, in this embodiment, in normal computational processing in a neural network, data that is propagated through a plurality of layers in the forward direction is called a forward data.

Figure 3:
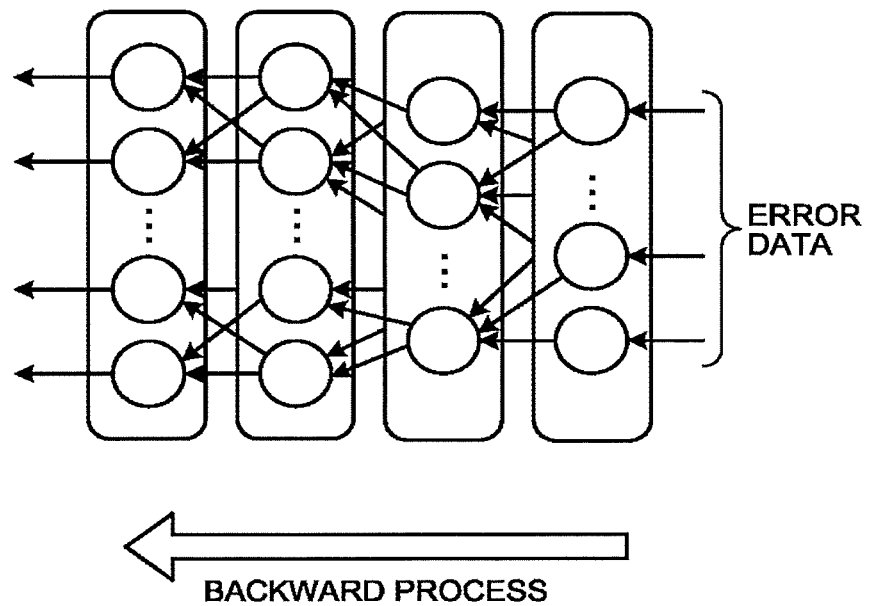
FIG. 3 is a diagram illustrating contents of learning processing (backward process)

FIG. 3 is a diagram illustrating contents of the learning processing (backward process) in the neural network. For each node, an error function is set. The error function is a derivative of an activation function set for that node. That is, the error function is a differentiation of the activation function set for that node.

In a case where the forward processing is completed, the learning unit 24 calculates an error data representing an error with respect to the output data output in the forward processing. Subsequently, in the backward processing, the data processing unit 20 provides the error data generated by the learning unit 24 to the output layer. In the backward processing, the data processing unit 20 propagates a plurality of data output from each layer in the backward direction to the immediately preceding layer.

Here, in this embodiment, in learning processing in a neural network, data that is propagated through a plurality of layers in the backward direction is referred to as a backward data.

Figure 4:
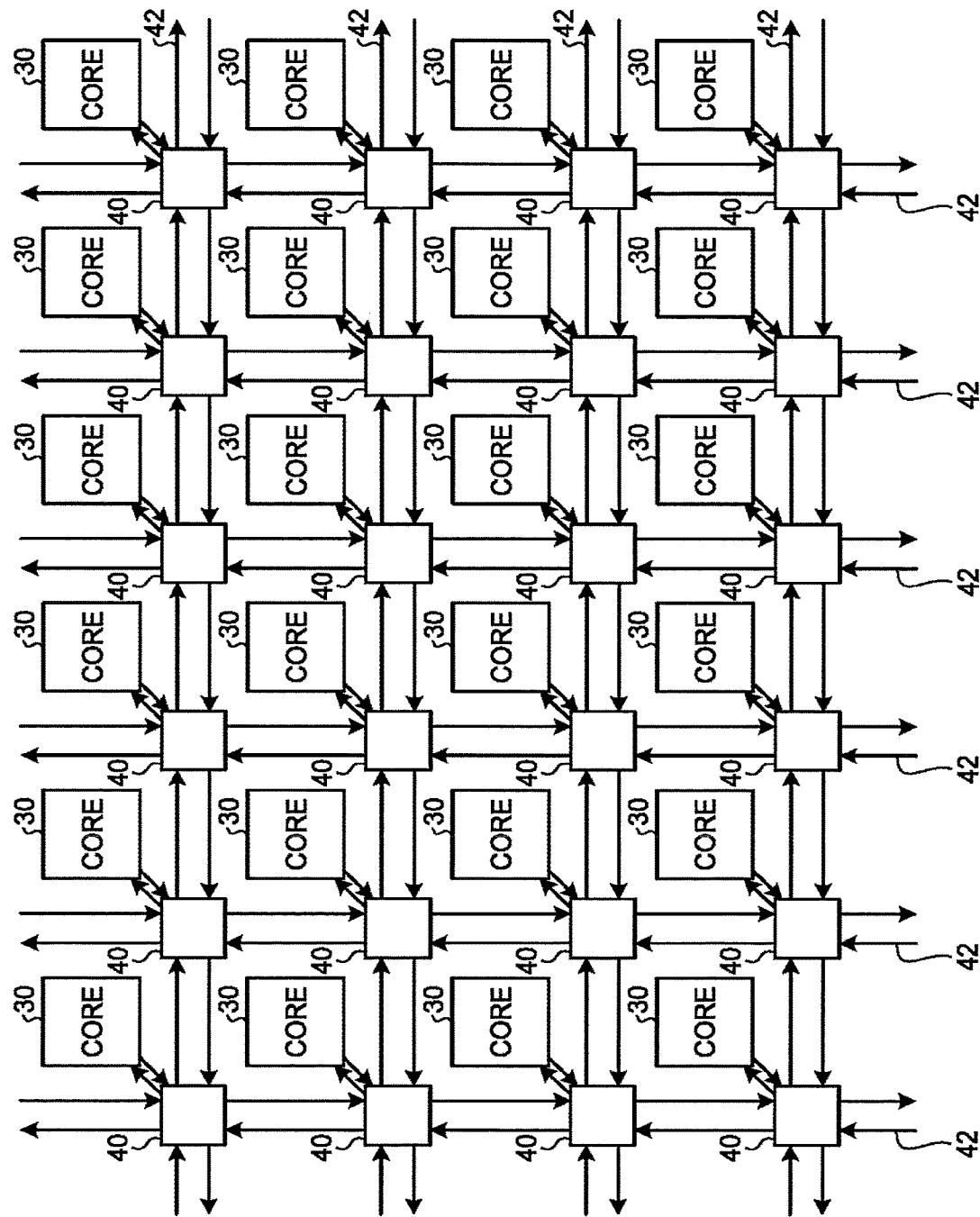
FIG. 4 is a diagram illustrating a configuration of a data processing unit.

FIG. 4 is a diagram illustrating a configuration of the data processing unit 20. The data processing unit 20 includes a plurality of cores 30, a plurality of routers 40, and a plurality of communication paths 42.

Each of the plurality of cores 30 performs computation and processing of a partial component in the neural network. Each of the plurality of cores 30 may be a processor, a dedicated hardware circuit, a digital circuit, or an analog circuit. In addition, each of the plurality of cores 30 may include a storage unit and store coefficients included in the neural network.

The plurality of routers 40 transmit the data output from each of the plurality of cores 30 to one of the plurality of the cores 30 via the communication path 42 such that computation and processing are executed according to the structure of the neural network.

For example, each of the plurality of routers 40 is arranged at a branch point of the communication path 42. Each of the plurality of routers 40 is directly connected to the plurality of other routers 40 via the communication path 42. Each of the plurality of routers 40 transmits and receives data to and from other routers 40 directly connected via the communication path 42.

In addition, the predetermined router 40 among the plurality of routers 40 may further be connected to one or the plurality of cores 30 to exchange data with the connected core 30. In this embodiment, the plurality of cores 30 are provided corresponding to the plurality of routers 40 on a one-to-one basis to transmit and receive data to and from the correspondingly provided routers 40.

Each of the plurality of routers 40 transmits data received from the router 40 or the core 30, which is a transmission source connected to the router 40, to other routers 40 or other cores 30 connected to the router 40 which is a transmission destination.

Figure 5:
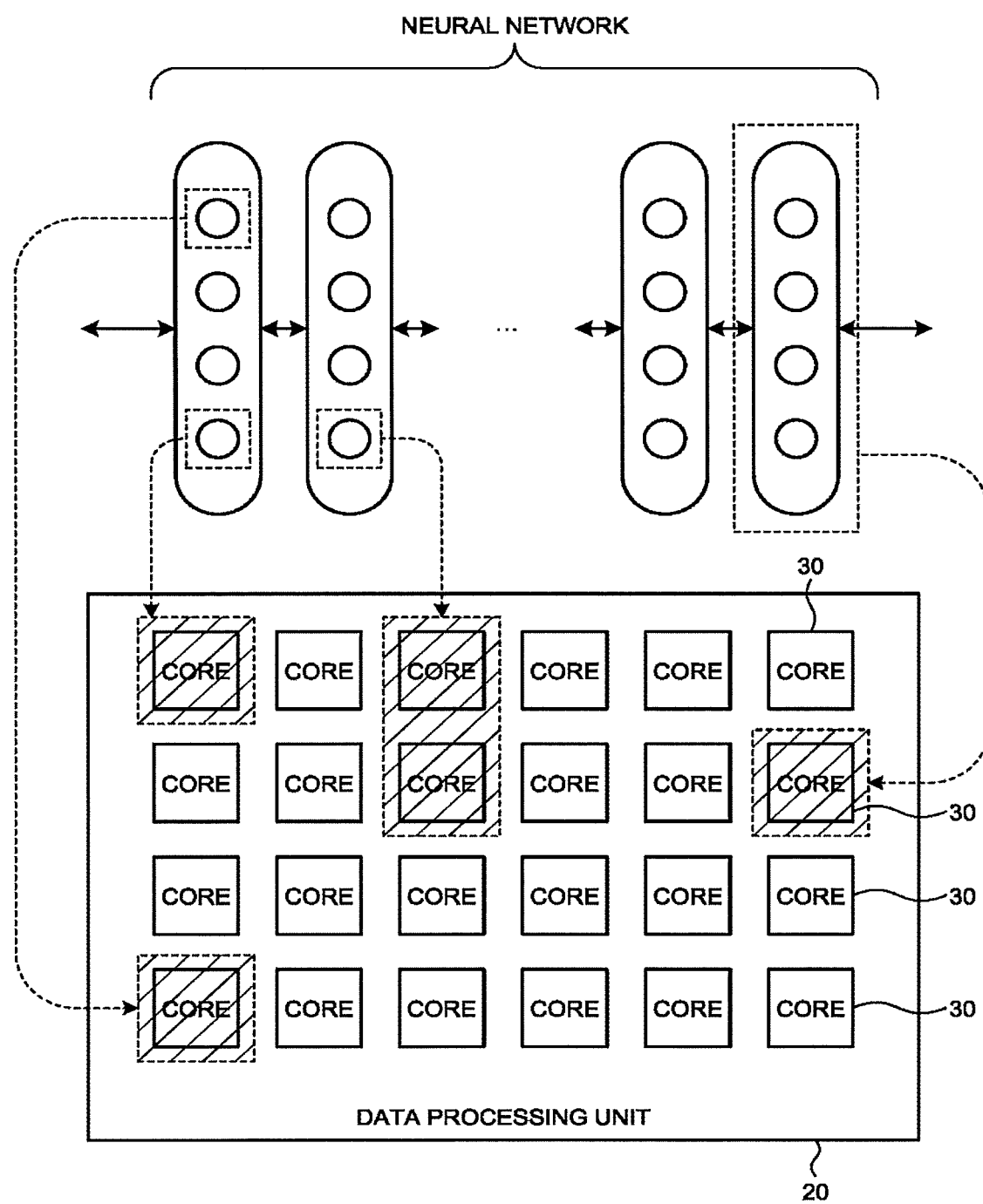
FIG. 5 is a diagram of a correspondence relationship between components and cores included in a neural network.

FIG. 5 is a diagram illustrating a correspondence relationship between the components included in the neural network and the core 30 executing processing in the components.

One of a plurality of components included in the neural network is allocated in advance to each of the plurality of cores 30. Each of the plurality of cores 30 executes computation or processing of pre-allocated components among the plurality of components included in the neural network.

The components included in the neural network are, for example, computation of an activation function and computation of an error function in a node, multiplication of a coefficient set in a link, addition of data multiplied by a coefficient, inputting of data from an external device, outputting of data to an external device, acquisition of an error data, outputting of a gradient data, and the like. The components are allocated to each of the plurality of cores 30 so that all the components included in the neural network are executed by at least one of the cores 30.

The processing executed in one core 30 may be, for example, processing executed in one node. For example, one core 30 may execute multiplication of coefficients set in a link, addition of a plurality of data received from the preceding layer, computation of an activation function, computation of an error function, or the like in a certain node of a certain layer.

In addition, the computation and processing executed in one core 30 may be computation on a part of one node. For example, one core 30 may perform computation of an activation function at one node, and another core 30 may perform multiplication and addition of coefficients at the node. In addition, the computation and processing executed in one core 30 may be all processing in a plurality of nodes included in one layer.

In this manner, the data processing unit 20 can distribute the processing of a plurality of components included in the neural network to the plurality of cores 30 and execute the processing.

Figure 6:
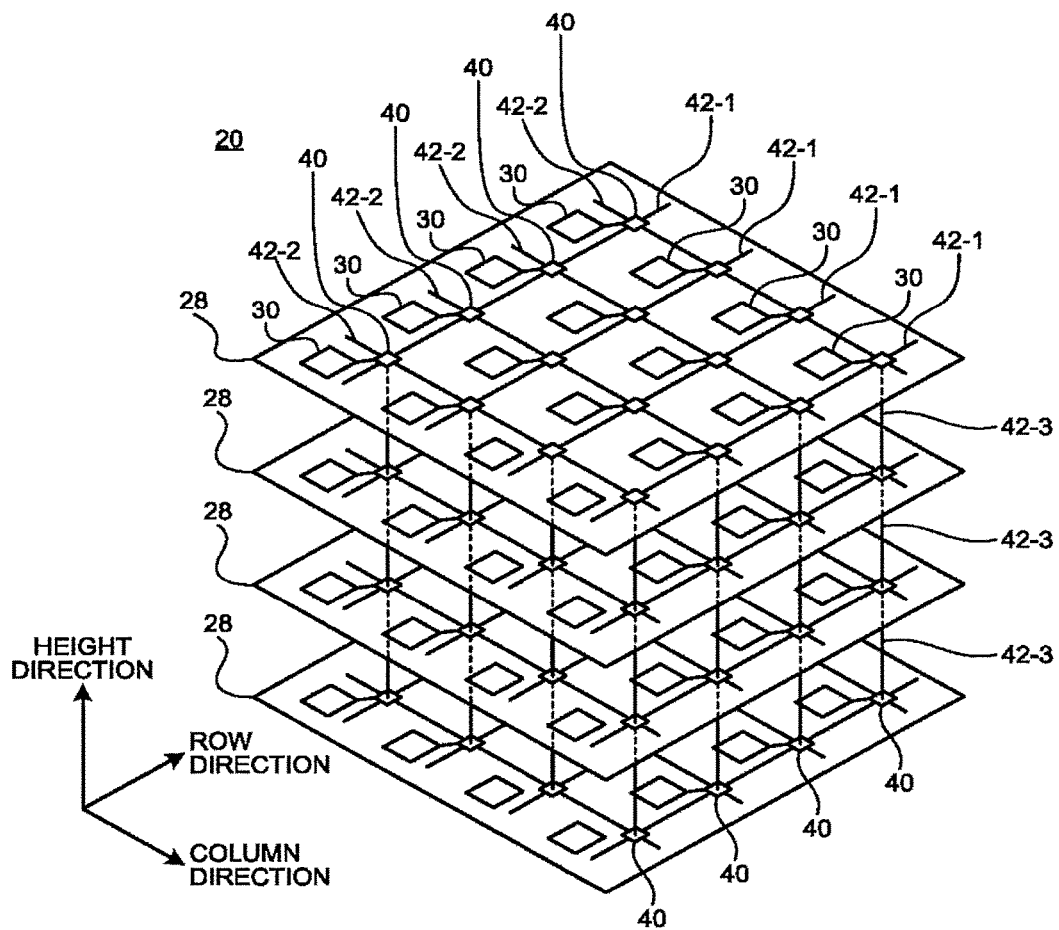
FIG. 6 is a diagram illustrating a plurality of partial regions in a data processing unit.

FIG. 6 is a diagram illustrating a plurality of partial regions 28. The data processing unit 20 includes the plurality of partial regions 28. The plurality of cores 30 and the plurality of routers 40 are included in one of the plurality of partial regions 28.

One partial region 28 is, for example, an entire region or a partial region in the circuit. In addition, one partial region 28 may be a partial region in the semiconductor device. In addition, one partial region 28 may be one of a plurality of stacked substrate layers in a semiconductor device.

In this embodiment, each of the plurality of partial regions 28 is a circuit in the semiconductor device. The plurality of partial regions 28 are formed in layers stacked in the vertical direction in the semiconductor device. For example, at least two upper and lower adjacent partial regions 28 can be electrically connected to each other. In addition, for example, the plurality of partial regions 28 may be a plurality of semiconductor chips mounted three-dimensionally or may be a plurality of circuit boards modularized in one package.

In this embodiment, each of the plurality of partial regions 28 includes M (M is 2 or more)×N (N is 2 or more) cores 30 and M×N routers 40. The M×N cores 30 are provided corresponding to the M×N routers 40 on a one-to-one basis. Each of the M×N cores 30 is connected to the corresponding router 40.

The M×N routers 40 are arranged in a matrix shape in a row direction (first arrangement direction) and a column direction (second arrangement direction). For example, the column direction is a direction perpendicular to the row direction.

Each of the plurality of partial regions 28 includes a plurality of first communication paths 42-1 and a plurality of second communication paths 42-2. The plurality of first communication paths 42-1 and the plurality of second communication paths 42-2 constitute a crossbar network. That is, in the partial region 28, the plurality of first communication paths 42-1 extend linearly in the column direction and are arranged at equal distance in the row direction. In the partial region 28, the plurality of second communication paths 42-2 extend linearly in the row direction and are arranged at equal distance in the column direction. Each of the plurality of first communication paths 42-1 crosses all of the plurality of second communication paths 42-2.

The M×N routers 40 are provided at all intersections of the first communication path 42-1 and the second communication path 42-2 in such a crossbar network. Accordingly, the M×N routers 40 can transmit data output from one of the cores 30 to one of the M×N cores 30 in the partial region 28.

The data processing unit 20 further includes a plurality of third communication paths 42-3. Each of the plurality of third communication paths 42-3 connects two routers 40 at the same matrix position included in two partial regions 28 adjacent in the height direction. Therefore, the router 40 included in a partial region 28 is connected to the other routers 40 at the same matrix position included in immediately upper and immediately lower other partial regions 28 via the third communication path 42-3. In addition, the router 40 included in the uppermost partial region 28 is connected only to the other routers 40 at the same matrix position included in immediately lower other partial regions 28. In addition, the router 40 included in the lowermost partial region 28 is connected only to the other routers 40 at the same matrix position included in immediately upper other partial regions 28.

Accordingly, the plurality of routers 40 included in the data processing unit 20 can transmit data output from one of the cores 30 included in the data processing unit 20 to one of the plurality of cores 30 included in the data processing unit 20.

In addition, in this embodiment, M and N are set to 2 or more. However, one of M and N may be set to 1 or more, and the other may be set to 2 or more. In this case, each of the plurality of partial regions 28 becomes a network of one row or a network of one column.

Figure 7:
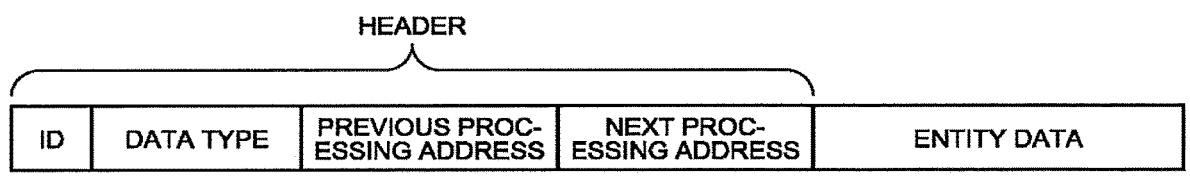
FIG. 7 is a diagram illustrating data transmitted and received between a plurality of cores and a plurality of routers.

FIG. 7 is a diagram illustrating an example of data transmitted and received between the plurality of cores 30 and the plurality of routers 40. The forward data and the backward data include, for example, an entity data and a header. The entity data is an object to be computed and processed in a neural network. The header includes information necessary for transmitting a packet to the target core 30 and information necessary for performing computation and processing on the entity data.

For example, the header includes an ID, a data type, a previous processing address, and a next processing address. The ID is information for identifying the input data which is a source of the entity data.

The data type is information for identifying whether the entity data is the forward data propagated in the forward direction (data propagated in a normal computational processing) or the backward data propagated in the backward direction (data propagated in a learning process).

The previous processing address is an address for identifying the core 30 that output the data. The previous processing address may be information for identifying the layer and the node that generated the data in the neural network.

The next processing address is an address for identifying the core 30 that is to be computed next or processed next for the data in the neural network. The next processing address may be information for identifying a component (layer, node, or the like) which performs computation or processing on the data in the neural network.

In addition, in a case where the data processing unit 20 is configured by stacking the networks in the height direction as illustrated in FIG. 6, the previous processing address and the next processing address may include a height address indicating a position in the height direction (for example, a number identifying the substrate layer or a number identifying the partial region 28) and an in-plane address indicating a position in the network (a matrix position in the partial region 28 or an intersection position in the crossbar network).

The header is not limited to the configuration as described above, but as long as the router 40 can transmit entity data to an appropriate core 30 so that computation and processing are performed according to the structure of the neural network, any other configurations may be used.

Figure 8:
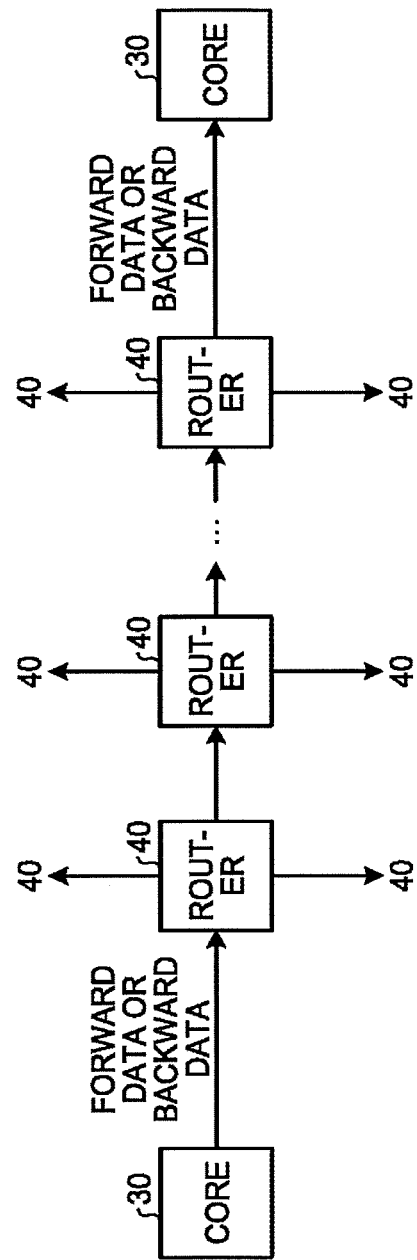
FIG. 8 is a diagram illustrating data transmitted and received between a plurality of cores and a plurality of routers.

FIG. 8 is a diagram illustrating data transmitted and received between the plurality of cores 30 and the plurality of routers 40.

Each of the plurality of cores 30 transmits at least one of the forward data propagated through the neural network in the forward direction and the backward data propagated through the neural network in the backward direction to the router 40 connected to the core 30.

In a case where each of the plurality of routers 40 receives data from the core 30 or other routers 40, each of the plurality of routers 40 analyzes the received data and identifies one router 40 that is suitable for transmitting the received data to the core 30 indicated in the next processing address among the plurality of routers 40 connected to the router itself. Then, each of the plurality of routers 40 transmits the received data to the identified router 40. In addition, as a result of analyzing the received data, in a case where the core 30 indicated in the next processing address is the core 30 connected to the router itself, each of the plurality of routers 40 transmits the received data to the core 30 connected to the router itself.

Accordingly, for example, as illustrated in FIG. 8, the plurality of cores 30 transmit data (forward data or backward data) output from an arbitrary core 30 to other cores 30 indicated in the next processing address.

Figure 9:
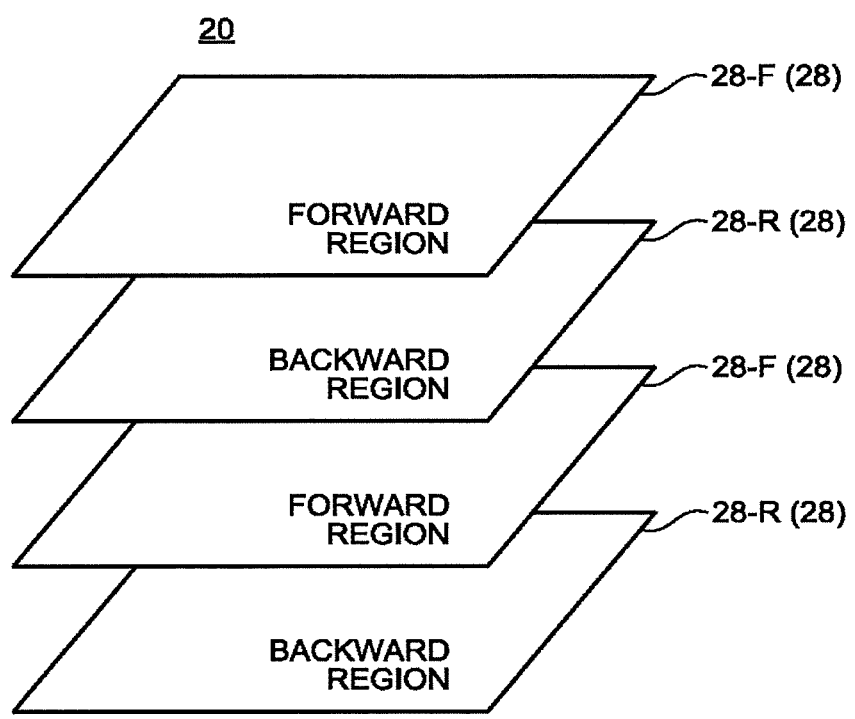
FIG. 9 is a diagram illustrating a type of each of a plurality of partial regions.

FIG. 9 is a diagram illustrating each type of the plurality of partial regions 28. Each of the plurality of partial regions 28 is set to any one of the forward region 28-F and the backward region 28-R. For example, in the plurality of partial regions 28, the forward region 28-F and the backward region 28-R are alternately stacked.

The router 40 included in the forward region 28-F transmits and receives only the forward data and does not transmit or receive the backward data to and from other routers 40 included in the same partial region. In addition, the router 40 included in the backward region 28-R transmits and receives only the backward data and does not transmit and receive the forward data to and from other routers 40 included in the same partial region.

In addition, both the forward data and the backward data are transmitted and received between the router 40 included in the forward region 28-F and the router 40 included in the backward region 28-R. In addition, all of the routers 40 transmit and receive both the forward data and the backward data to and from the connected core 30.

Figure 10:
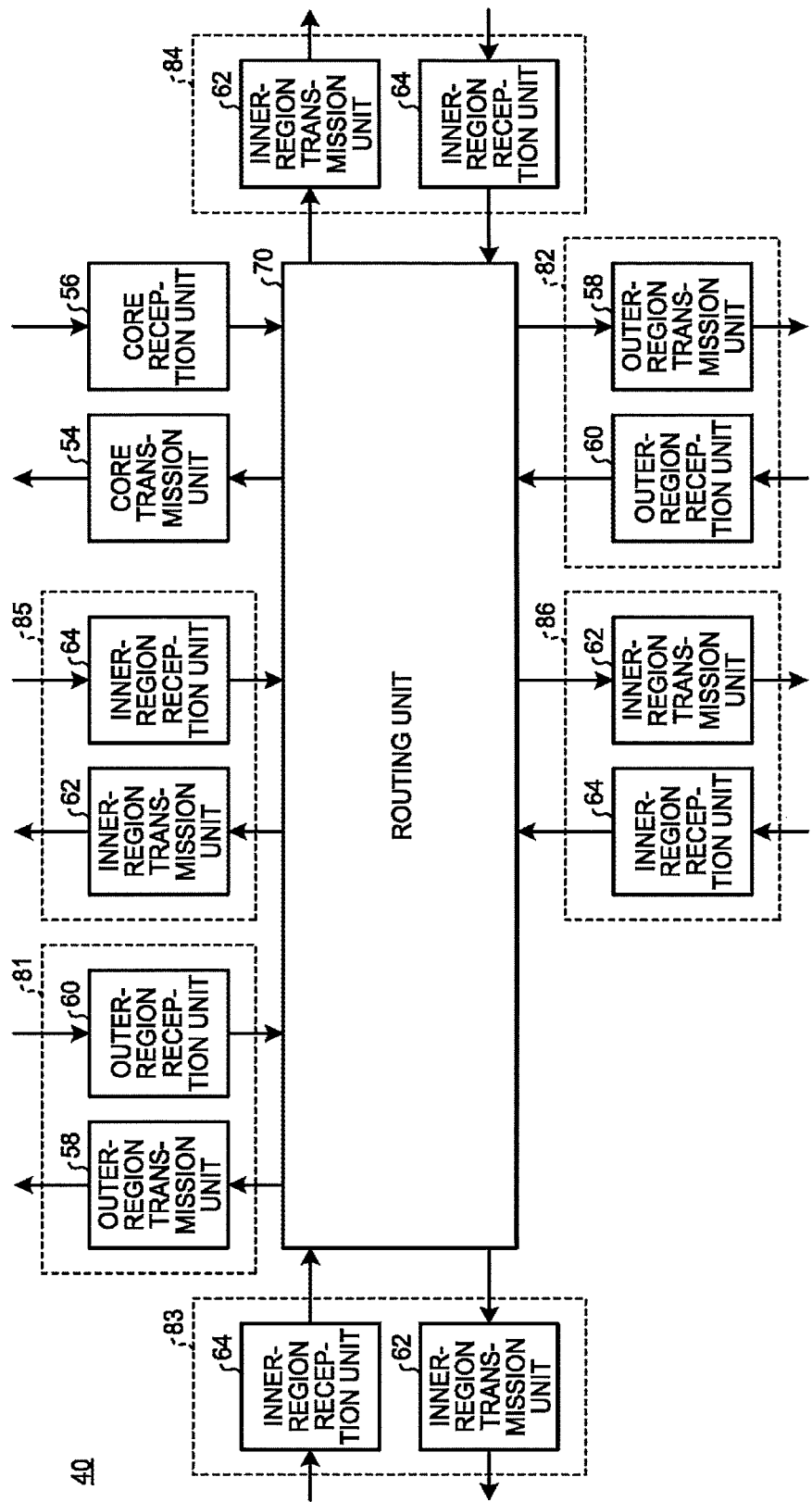
FIG. 10 is a diagram illustrating a configuration of a router.

FIG. 10 is a diagram illustrating a configuration of the router 40. The router 40 includes a core transmission unit 54, a core reception unit 56, an outer-region transmission unit 58, an outer-region reception unit 60, an inner-region transmission unit 62, an inner-region reception unit 64, and a routing unit 70.

The core transmission unit 54 and the core reception unit 56 are connected to the core 30 provided corresponding to the router 40. The core transmission unit 54 transmits the forward data and the backward data to the connected core 30. The core reception unit 56 receives the forward data and the backward data from the connected core 30.

The outer-region transmission unit 58 and the outer-region reception unit 60 are connected to the other routers 40 included in the other partial regions 28 different from the partial region 28 including this router 40. That is, the outer-region transmission unit 58 and the outer-region reception unit 60 are connected to one of the other routers 40 included in the other partial regions 28.

The outer-region transmission unit 58 transmits the forward data and the backward data to the connected other routers 40. In addition, the outer-region reception unit 60 receives the forward data and the backward data from the connected other routers 40.

The inner-region transmission unit 62 and the inner-region reception unit 64 are connected to other routers 40 included in the partial region 28 including this router 40. That is, the inner-region transmission unit 62 and the inner-region reception unit 64 are connected to one of the other routers 40 included in the same partial region.

The inner-region transmission unit 62 included in the router 40 included in the forward region 28-F transmits only the forward data to the connected other routers 40. That is, the inner-region transmission unit 62 included in the router 40 included in the forward region 28-F does not transmit the backward data to the connected other routers 40.

In addition, the inner-region reception unit 64 included in the router 40 included in the forward region 28-F receives only the forward data from the connected other router 40. That is, the inner-region reception unit 64 included in the router 40 included in the forward region 28-F does not receive the backward data from the connected other routers 40.

In addition, the inner-region transmission unit 62 included in the router 40 included in the backward region 28-R transmits only the backward data to the connected other router 40. That is, the inner-region transmission unit 62 included in the router 40 included in the backward region 28-R does not transmit the forward data to the connected other routers 40.

In addition, the inner-region reception unit 64 included in the router 40 included in the backward region 28-R receives only the backward data from the connected other router 40. That is, the inner-region reception unit 64 included in the router 40 included in the backward region 28-R does not receive the forward data from the connected other routers 40.

The routing unit 70 receives the forward data or backward data received by the core reception unit 56, the outer-region reception unit 60, and the inner-region reception unit 64. The routing unit 70 analyzes the received forward data or backward data and then identifies the router 40 or the core 30 which is to receive the forward data or the backward data next. Then, the routing unit 70 provides the received forward data or backward data to the core transmission unit 54, the outer-region transmission unit 58, or the inner-region transmission unit 62 connected to the identified router 40 or the identified core 30.

Herein, in a case where the plurality of partial regions 28 have a stack structure as illustrated in FIG. 9, the router 40 has a first group 81 including an outer-region transmission unit 58 and an outer-region reception unit 60 and a second group 82 including an outer-region transmission unit 58 and an outer-region reception unit 60.

The outer-region transmission unit 58 and the outer-region reception unit 60 of the first group 81 are connected to other routers 40 at the same matrix position included in the immediately lower partial region 28. In addition, the outer-region transmission unit 58 and the outer-region reception unit 60 of the second group 82 included in the lowermost partial region 28 are not connected to the other routers 40.

The outer-region transmission unit 58 and the outer-region reception unit 60 included in the second group 82 are connected to other routers 40 at the same matrix position included in the immediately upper partial region 28. In addition, the outer-region transmission unit 58 and the outer-region reception unit 60 of the second group 82 included in the uppermost partial region 28 are not connected to other routers 40.

In addition, in a case where the plurality of partial regions 28 have the stacked structure as illustrated in FIG. 9, the router 40 includes a third group 83 including an inner-region transmission unit 62 and an inner-region reception unit 64, a fourth group 84 including an inner-region transmission unit 62 and an inner-region reception unit 64, a fifth group 85 including an inner-region transmission unit 62 and an inner-region reception unit 64, and a sixth group 86 including an inner-region transmission unit 62 and an inner-region reception unit 64.

The inner-region transmission unit 62 and the inner-region reception unit 64 of the third group 83 are connected to another router 40 adjacent along the row direction (first arrangement direction) in the same partial region. The inner-region transmission unit 62 and the inner-region reception unit 64 of the fourth group 84 are connected to another router 40 adjacent along the row direction (first arrangement direction) opposite to the third group 83 in the same partial region. In addition, in the router 40 at the outermost end in the row direction, one of the third group 83 and the fourth group 84 is not connected to the other router 40.

The inner-region transmission unit 62 and the inner-region reception unit 64 of the fifth group 85 are connected to another router 40 adjacent along the column direction (second arrangement direction) in the same partial region. The inner-region transmission unit 62 and the inner-region reception unit 64 of the sixth group 86 are connected to another router 40 adjacent along the column direction (second arrangement direction) opposite to the fifth group 85 in the same partial region. In addition, in the router 40 at the outermost end in the column direction, one of the fifth group 85 and the sixth group 86 is not connected to the other router 40.

Figure 11:
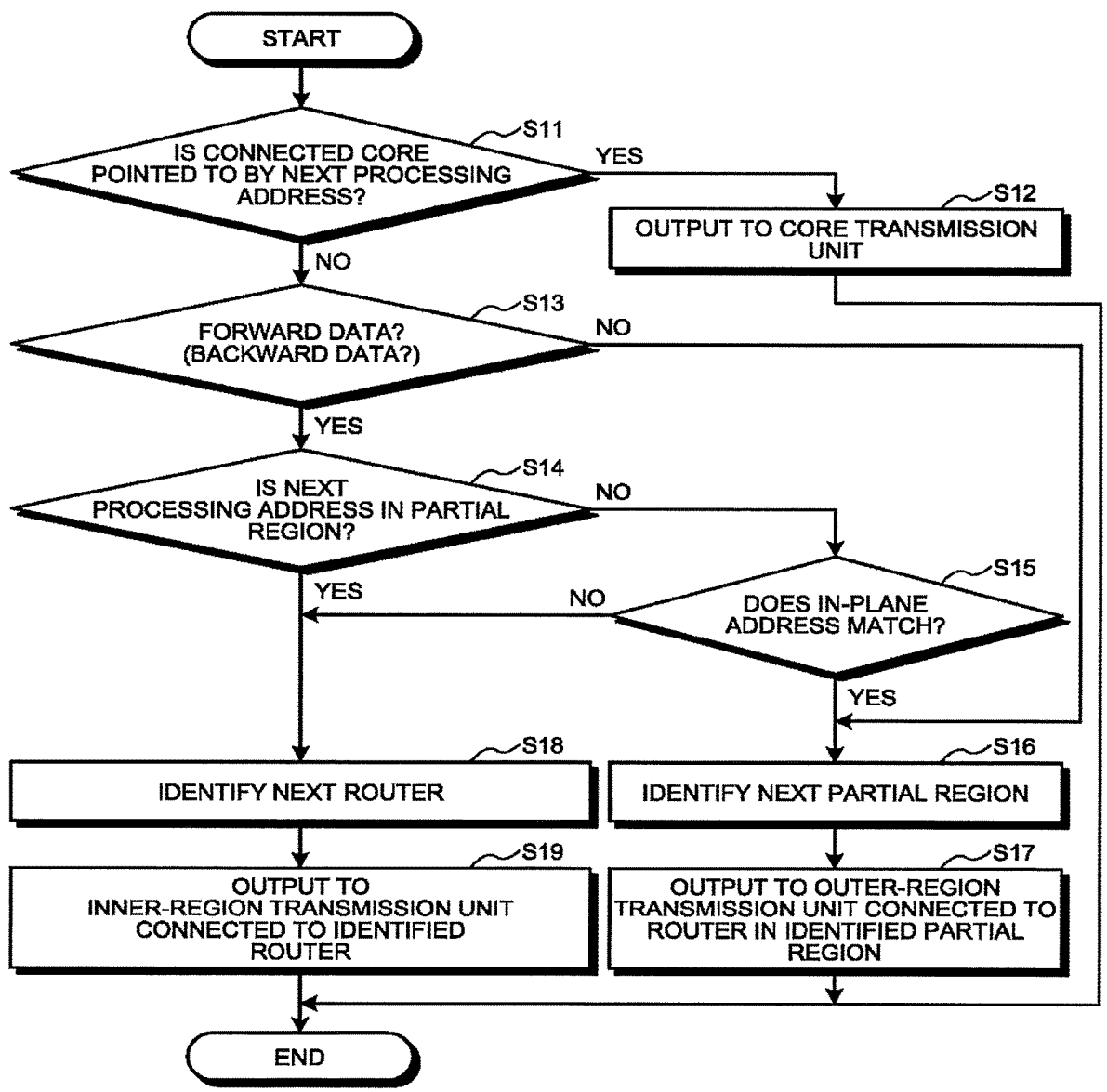
FIG. 11 is a flowchart illustrating a processing procedure of the routing unit.

FIG. 11 is a flowchart illustrating a processing procedure in a case where the routing unit 70 receives data. In the case of receiving the forward data or the backward data from the core reception unit 56, the outer-region reception unit 60, and the inner-region reception unit 64, the routing unit 70 executes processing as illustrated in FIG. 11.

First, the routing unit 70 determines whether or not the next processing address indicated in the received data points to the core 30 connected to the routing unit itself. In a case where the next processing address points to the core 30 connected to the routing unit itself (Yes in S11), the routing unit 70 allows the processing to proceed to S12. In S12, the routing unit 70 outputs the received forward data or backward data to the core transmission unit 54. After completing S12, the routing unit 70 ends this flow.

In a case where the next processing address does not point to the core 30 connected to the routing unit itself (No in S11), the routing unit 70 allows the processing to proceed to S13.

The processing in S13 differs depending on whether the router 40 included in the forward region 28-F includes the routing unit 70 or the router 40 included in the backward region 28-R includes the routing unit 70.

The routing unit 70 included in the router 40 included in the forward region 28-F determines whether or not the received data is a forward data in S13. In a case where the received data is the forward data (Yes in S13), the routing unit 70 included in the router 40 included in the forward region 28-F allows the processing to proceed to S14, and in a case where the received data is not a forward data (No in S13), the routing unit 70 allows the processing to proceed to S16.

The routing unit 70 included in the router 40 included in the backward region 28-R determines whether or not the received data is a backward data in S13. In a case where the received data is the backward data (Yes in S13), the routing unit 70 included in the router 40 included in the backward region 28-R allows the processing to proceed to S14, and in a case where the received data is not a backward data (No in S13), the routing unit 70 allows the processing to proceed to S16.

In S14, the routing unit 70 determines whether or not the next processing address indicated in the received data points to the core 30 provided in the same partial region. In a case where the next processing address points to the core 30 provided in the same partial region or in a case where the transmission distance can be shortened (Yes in S14), the routing unit 70 allows the processing to proceed to S18. In a case where the next processing address does not point to the core 30 provided in the same partial region (No in S14), the routing unit 70 allows the processing to proceed to S15.

In S15, the routing unit 70 determines whether or not the in-plane address included in the next processing address indicated in the received data matches the in-plane address of the core 30 connected to the routing unit itself. That is, the routing unit 70 determines whether or not the core 30 indicated in the next processing address and the core 30 connected to the routing unit itself are at the same matrix position (the same intersection position on the crossbar network). In the case of the same matrix position, the received data can reach the core 30 indicated in the next processing address even if the data is not transmitted in the partial region 28. However, in the case of being not the same matrix position, the received data cannot reach the core 30 indicated in the next processing address unless the data is further transmitted in the partial region 28. Therefore, in a case where the in-plane addresses match (Yes in S15), the routing unit 70 allows the processing to proceed to S16. In a case where the in-plane addresses do not match (No in S15), the routing unit 70 allows the processing to proceed to S18.

In S16, on the basis of the next processing address, the routing unit 70 identifies the partial region 28 that is to next receive the received forward data or backward data among one or a plurality of the connected other partial regions 28. Subsequently, in S17, the routing unit 70 outputs the received forward data or backward data to the outer-region transmission unit 58 connected to the router 40 included in the identified partial region 28. After completing S17, the routing unit 70 ends this flow.

In S18, on the basis of the next processing address, the routing unit 70 identifies the router 40 that is to next receive the received forward data or backward data among the plurality of adjacent routers 40 in the same partial region. Subsequently, in S19, the routing unit 70 outputs the received forward data or backward data to the inner-region transmission unit 62 connected to the identified router 40. After completing S19, the routing unit 70 ends this flow.

Figure 12:
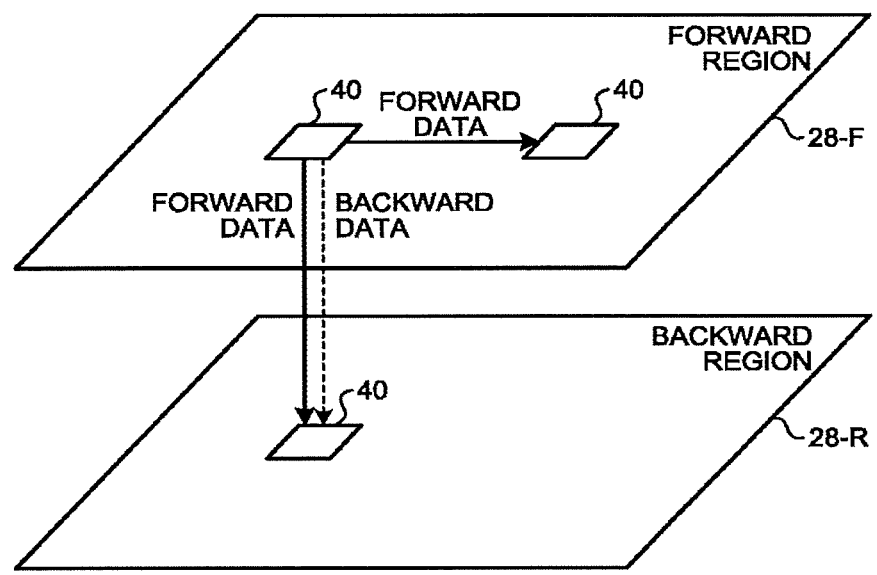
FIG. 12 is a diagram illustrating data transmitted by routers included in a forward region.

FIG. 12 is a diagram illustrating data transmitted by the router 40 included in the forward region 28-F. The router 40 included in the forward region 28-F can transmit the forward data to the other routers 40 included in the same partial region. But, the router 40 included in the forward region 28-F cannot transmit the backward data to the other routers 40 included in the same partial region. However, the router 40 included in the forward region 28-F can transmit both the forward data and the backward data to the other routers 40 included in the other partial regions 28.

Figure 13:
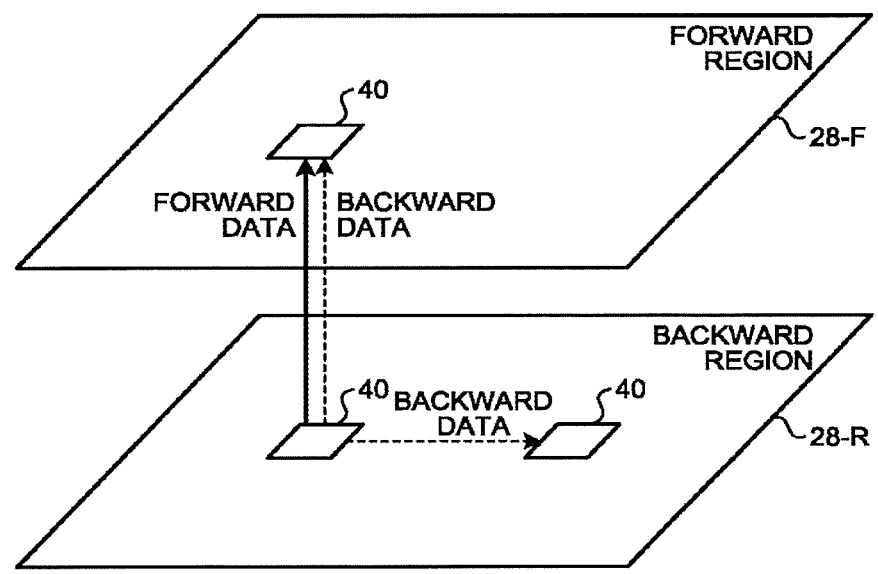
FIG. 13 is a diagram illustrating data transmitted by a router included in a backward region.

FIG. 13 is a diagram illustrating data transmitted by the router 40 included in the backward region 28-R. The router 40 included in the backward region 28-R can transmit the backward data to the other routers 40 included in the same partial region. But, the router 40 included in the backward region 28-R cannot transmit the forward data to the other routers 40 included in the same partial region. However, the router 40 included in the backward region 28-R can transmit both the forward data and the backward data to the other routers 40 included in the other partial regions 28.

Figure 14:
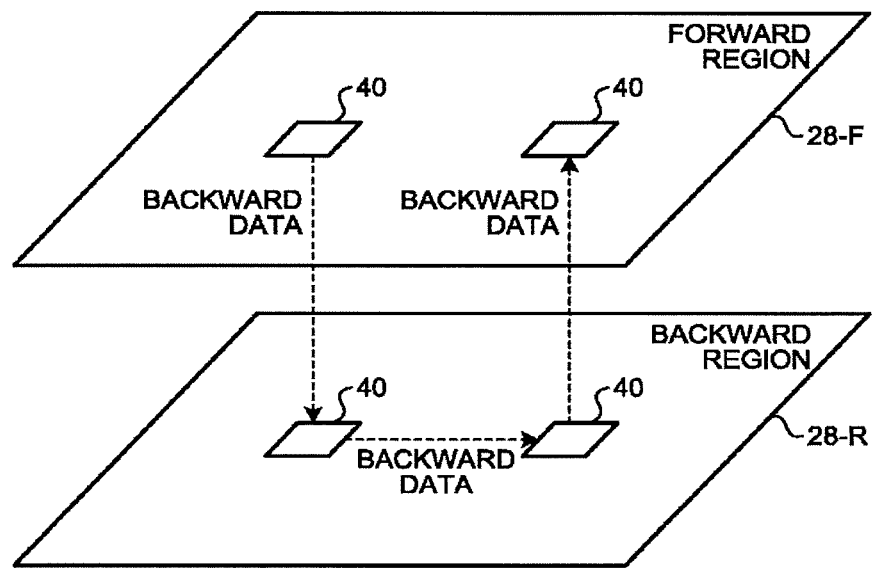
FIG. 14 is a route diagram of backward data transmitted from routers included in the forward region.

FIG. 14 is a diagram illustrating an example of the route of the backward data transmitted from the router 40 included in the forward region 28-F. In the data processing unit 20 having such a configuration, for example, in a case where the backward data is transmitted from the router 40 included in the forward region 28-F to other routers 40 included in the same partial region, the backward data is transmitted in a route passing through the backward region 28-R.

Figure 15:
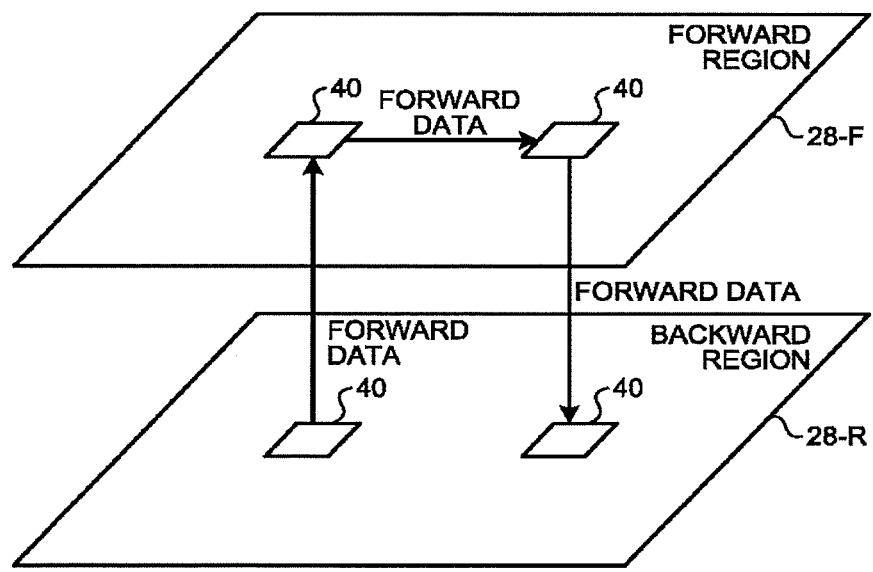
FIG. 15 is a route diagram of forward data transmitted from routers included in the backward region.

FIG. 15 is a diagram illustrating an example of the route of the forward data transmitted from the router 40 included in the backward region 28-R. In the data processing unit 20 having such a configuration, for example, in a case where the forward data is transmitted from the router 40 included in the backward region 28-R to other routers 40 included in the same partial region, the forward data is transmitted in a route passing through the forward region 28-F.

Figure 16:
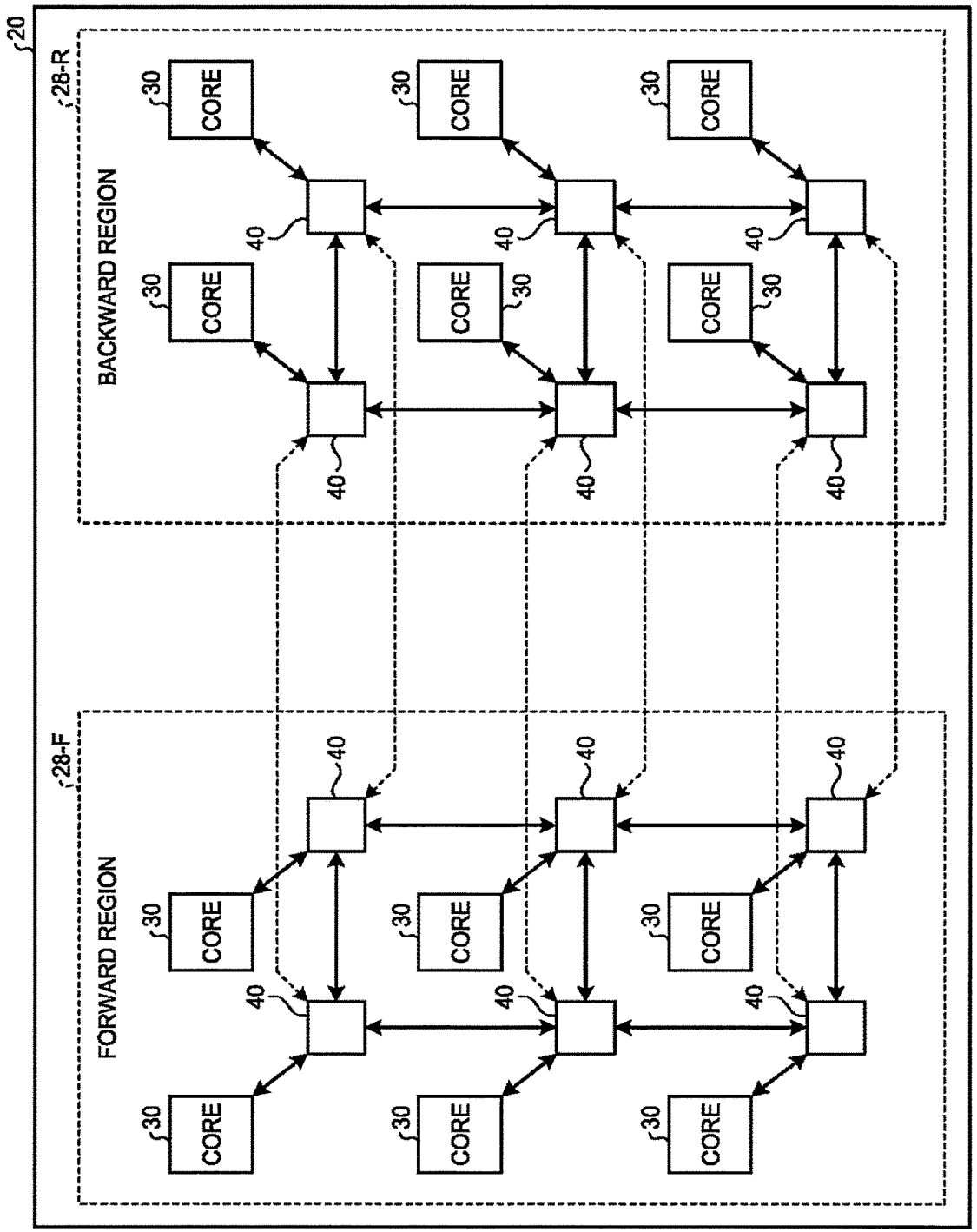
FIG. 16 is a diagram illustrating Modified Example of a configuration of a data processing unit.

FIG. 16 is a diagram illustrating a modified example of the configuration of the data processing unit 20. The data processing unit 20 is not limited to the configuration including the plurality of partial regions 28 stacked in the vertical direction. For example, as illustrated in FIG. 16, the data processing unit 20 may be formed in separate regions of one substrate or one semiconductor layer. In addition, the data processing unit 20 may have a configuration in which a substrate or a semiconductor layer including a plurality of partial regions 28 is further stacked. In addition, the data processing unit 20 may include a plurality of partial regions 28 provided on separate substrates which are separate physically.

As described above, the neural network device 10 according to this embodiment includes the forward region 28-F transmitting and receiving the forward data propagated in the normal computational processing (forward process) in the neural network and the backward region 28-R transmitting and receiving the backward data propagated in the learning processing (backward process). Accordingly, the neural network device 10 can reduce the traffic congestion inside the neural network device even in a case where the normal data processing and the learning processing in the neural network are executed in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A neural network device comprising:
a plurality of cores each executing computation and processing of a partial component in a neural network; and
a plurality of routers transmitting data output from each of the plurality of cores to one of the plurality of cores such that computation and processing are executed according to a structure of the neural network, wherein
each of the plurality of cores outputs at least one of a forward data propagated through the neural network in a forward direction and a backward data propagated through the neural network in a backward direction,
each of the plurality of routers is included in one of a plurality of partial regions,
each of the plurality of partial regions is a forward region or a backward region,
a router included in the forward region transmits the forward data to another router in a same partial region as the router included in the forward region, and
a router included in the backward region transmits the backward data to another router in the same partial region as the router included in the backward region,
each of the plurality of routers includes an outer-region transmission circuitry and an outer-region reception circuitry connected to another router included in another partial region,
the outer-region transmission circuitry transmits the forward data and the backward data to a connected other router, and
the outer-region reception circuitry receives the forward data and the backward data from the connected other router,
each of the plurality of routers further includes an inner-region transmission circuitry and an inner-region reception circuitry connected to another router included in the same partial region as each of the plurality of routers,
an inner-region transmission circuitry included in the router included in the forward region transmits the forward data to a connected other router, and
an inner-region reception circuitry included in the router included in the forward region receives the forward data from the connected other router.

2. The device according to claim 1, wherein
the router included in the forward region does not transmit the backward data to the other router in the same partial region as the router included in the forward region, and
the router included in the backward region does not transmit the forward data to the other router in the same partial region as the router included in the backward region.

3. The device according to claim 1, wherein
an inner-region transmission circuitry included in the router included in the backward region transmits the backward data to a connected other router, and an inner-region reception circuitry included in the router included in the backward region receives the backward data from the connected other router.

4. The device according to claim 3, wherein
a predetermined router among the plurality of routers further includes a core transmission circuitry and a core reception circuitry connected to a core of the plurality of cores,
the core transmission circuitry transmits the forward data and the backward data to a connected core, and
the core reception circuitry receives the forward data and the backward data from the connected core.

5. The device according to claim 4, wherein the plurality of partial regions correspond to a plurality of circuits stacked in a vertical direction.

6. The device according to claim 5, wherein each of the plurality of partial regions includes:
M×N routers arranged in a matrix shape, wherein M is 2 or more and N is 2 or more; and
M×N cores corresponding to the M×N routers on a one-to-one basis.

7. The device according to claim 6, wherein each of the plurality of routers includes:
a first group including an outer-region transmission circuitry and an outer-region reception circuitry connected to another router at a same matrix position included in a partial region formed in an immediately lower layer; and
a second group including an outer-region transmission circuitry and an outer-region reception circuitry connected to another router at the same matrix position included in a partial region formed in an immediately upper layer.

8. The device according to claim 7, wherein each of the plurality of routers further includes:
a third group including an inner-region transmission circuitry and an inner-region reception circuitry connected to another router adjacent along a row direction in the same partial region as each of the plurality of routers;
a fourth group including an inner-region transmission circuitry and an inner-region reception circuitry connected to another router adjacent along the row direction opposite to the third group in the same partial region as each of the plurality of routers;
a fifth group including an inner-region transmission circuitry and an inner-region reception circuitry connected to another router adjacent along a column direction in the same partial region as each of the plurality of routers; and
a sixth group including an inner-region transmission circuitry and an inner-region reception circuitry connected to another router adjacent along the column direction opposite to the fifth group in the same partial region as each of the plurality of routers.

9. The device according to claim 5, wherein each of the plurality of partial regions includes:
M×N routers, wherein M is 1 or more and N is 2 or more; and
M×N cores corresponding to the M×N routers on a one-to-one basis.

10. The device according to claim 5, wherein the plurality of partial regions include the forward region and the backward region stacked alternately.

11. The device according to claim 1, wherein
the device executes data processing and learning processing in the neural network in parallel.

12. The device according to claim 11, wherein
the plurality of routers transmit
the forward data output from each of the plurality of cores to one of the plurality of cores such that next processing in the data processing is performed; and
the backward data output from each of the plurality of cores to one of the plurality of cores such that next processing in the learning processing is performed.

13. The device according to claim 12, wherein
each of the plurality of routers
when receiving data from one of the plurality of cores, with respect to received data, determines whether or not the next processing in the data processing or the next processing in the learning processing is performed by a core connected to the router itself among the plurality of cores;
with respect to the received data, when the next processing in the data processing or the next processing in the learning processing is performed by the core connected to the router itself, transmits the received data to the core connected to the router itself; and
with respect to the received data, when neither the next processing in the data processing nor the next processing in the learning processing is performed by the core connected to the router itself, determines whether the received data is the forward data or the backward data, wherein
the router included in the forward region transmits, when determination is such that the backward data is received, the backward data to another router included in another partial region; and
the router included in the backward region transmits, when determination is such that the forward data is received, the forward data to another router included in another partial region.

14. The device according to claim 13, wherein
the data output from each of the plurality of cores includes a data type;
the data type is information for identifying the data as the forward data or the backward data; and
each of the plurality of routers determines whether the received data is the forward data or the backward data based on the data type included in the received data.

* * * * *